(12) United States Patent
Hiray et al.

(10) Patent No.: US 7,440,998 B2
(45) Date of Patent: Oct. 21, 2008

(54) PROVISIONING FOR A MODULAR SERVER

(75) Inventors: Sandip M. Hiray, Federal Way, WA (US); Mallik Bulusu, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 802 days.

(21) Appl. No.: 10/465,130

(22) Filed: Jun. 18, 2003

(65) Prior Publication Data

US 2004/0260936 A1 Dec. 23, 2004

(51) Int. Cl.
*G06F 9/445* (2006.01)
(52) U.S. Cl. ............... 709/203; 713/1; 713/2; 713/194

(58) Field of Classification Search ........... 709/203, 709/229, 219; 710/107, 37; 713/202, 220, 713/222, 2
See application file for complete search history.

(56) References Cited

U.S. PATENT DOCUMENTS

| | | | |
|---|---|---|---|
| 6,442,559 B1 * | 8/2002 | Martinsen et al. | 707/102 |
| 6,904,482 B2 * | 6/2005 | Rietze et al. | 710/107 |
| 7,013,385 B2 * | 3/2006 | Abbondanzio et al. | 713/2 |
| 7,114,180 B1 * | 9/2006 | DeCaprio | 726/18 |
| 2005/0216757 A1 * | 9/2005 | Gardner | 713/194 |
| 2005/0246568 A1 * | 11/2005 | Davies | 714/2 |

* cited by examiner

*Primary Examiner*—Nathan J. Flynn
*Assistant Examiner*—Jude J Jean Gilles
(74) *Attorney, Agent, or Firm*—Fish & Richardson P.C.

(57) ABSTRACT

A modular server includes a computer system having dedicated resources and a BIOS configuration agent, blades and a backplane connecting the computer system to the blades.

30 Claims, 3 Drawing Sheets

PROVISIONING FOR A MODULAR SERVER

BACKGROUND

This invention relates to provisioning for a modular server.

An example of a modular server is a so-called blade server that includes a cluster of blades, each of which are dedicated to a single task, such as file sharing, web page serving and caching, secured sockets layer (SSL) encrypting of web communications, transcoding of web page content for smaller displays, or streaming audio and video content.

The behavior of each of the blades in a modular server during boot is governed by its personality, as captured in both persistent and volatile memory areas, such as non-volatile random access memory (NVRAM) data areas of the blade, complimentary metal-oxide semiconductor (CMOS) tokens and data items, and variables in random access memory (RAM). Personality refers to a behavior of a blade that is configured by an end user and includes, for example, default boot order, localization, enabling/disabling features, allocation of resources and authentication information. For the sake of manageability, such personality data is typically stored in memory where it is prone to corruption.

DETAILED DESCRIPTION

Figure 1:
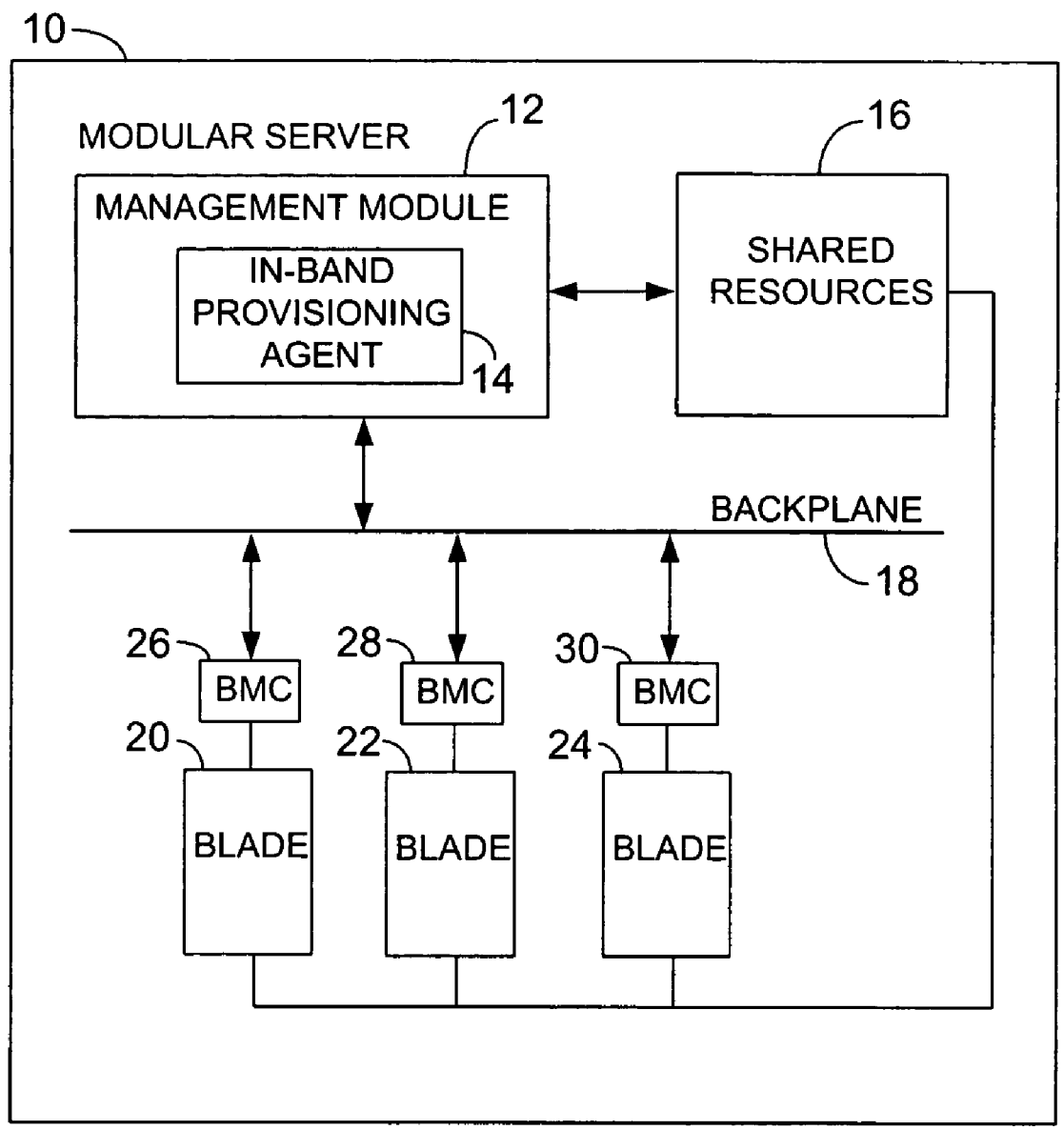
FIG. 1 is a block diagram of a modular server.

In FIG. 1, a modular server 10, for example, a blade server, includes a management module 12 containing an in-band provisioning agent (IBPA) 14 and shared resources 16. The term "in-band" refers to a fact that the provisioning agent 14 functions continuously during system 10 operation. The modular server 10 includes a backplane 18 and three blades 20, 22, 24, although any number of blades could be included in the modular server 10. Each of the blades 20, 22, 24 includes an associated BMC 26, 28, 30, generally referred to as a baseboard management controller (BMC). Each of the blades 20, 22, 24 communicates with management module 12 through a respective BMC 26, 28, 30, and backplane 18. Each of the blades 20, 22, 24 includes basic input output system (BIOS) personality data that is stored in the management module 12.

The management module 12 is a complete computer system having dedicated resources, such as a monitor, keyboard, floppy drive and CDROM drive. Each of the blades 20, 22, 24 is a computer system that does not typically include dedicated resources, but instead utilizes the shared resources 16. For example, if blade 20 requires use of a floppy drive, blade 20 makes a request for the floppy drive, one of the shared resources 16, through its BMC 26 to the management module 12. The management module 12 can temporarily allocate the floppy drive from the shared resources 16 to the blade 20 if it is available and not allocated to blade 22 or blade 24.

One feature of the modular server 12 is that the blades 20, 22, 24 can be asymmetric, e.g., they can have different architectures (e.g., 32-bit, 64-bit), varying processor frequencies, and so forth. In another feature of the blade, in the event of data corruption, certain Disk Operating System (DOS)/Extensible Firmware Interface (EFI)-based utilities are used to restore the blade BIOS personality. The blade BIOS personality, i.e., the behavior of a system, can be configured and restored to a multitude of end-user preferences. Configuration and restoration tools can be EFI-based applications, 16-bit applications, 32-bit applications or DOS applications. Most systems are capable of multiple behaviors. The term "personality" refers to an instance of a number of such behaviors, which controls a boot and associated configuration elements that are loaded.

A typical requirement of blade servers, such as modular server 10, is that each BMC uses a published protocol for communication to and from the backplane 18 and management module 12.

Figure 2:
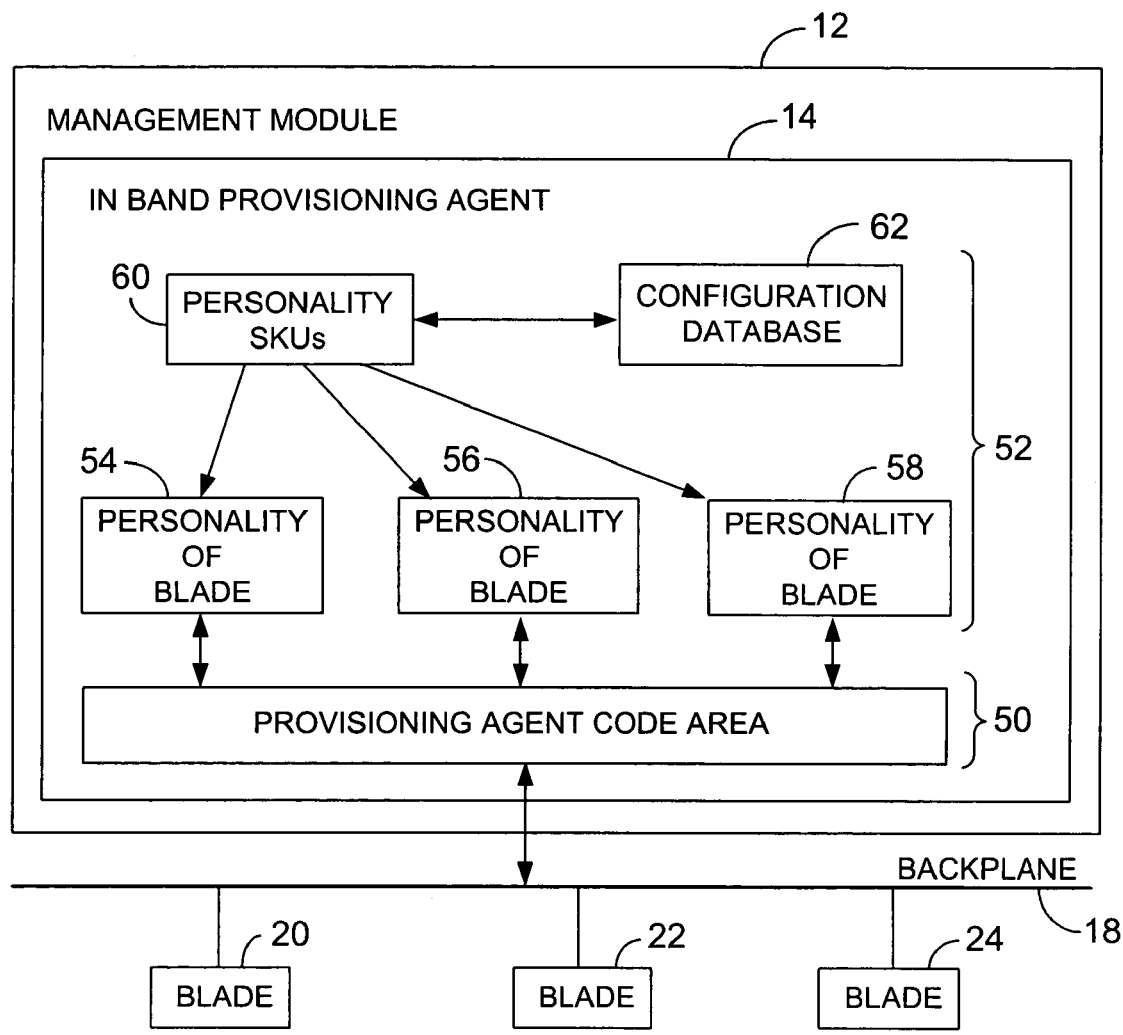
FIG. 2 is a block diagram of an in-band provisioning agent.

In FIG. 2, the in-band provisioning agent IBPA 14 performs blade personality management for each of the blades 20, 22, 24 within the module server 10. In-band provisioning generally refers to configuring the blade using existing pathways within the modular server 10, such as the backplane 18 and blade controller 26, 28, 30, during a boot sequence, without a need for operator input. Personality management includes scheduling basic input output system (BIOS) updates, versioning conflict resolution (e.g., BIOS version compatibility), handling corruption/integrity issues in conjunction with the proper recovery applications, and allocation of shared resources. The IBPA 14 includes a provisioning agent code 50 and a data area 52. Data is prone to frequent changes and thus isolated from code for convenience. The provisioning agent code 50 communicates with each of the BMCs 26, 28, 30 to manage BIOS personality data of the blade. The data area 52 stores a blade personality database 54, 56, 58 for each blade 20, 22, 24, respectively. Optionally, the data area 52 can also include personality stock keeping units (SKUs) 60 mapped to a configuration database 62. A SKU is an identification, usually alphanumeric, of a particular blade. Each SKU is mapped to corresponding configuration information in configuration database 62. For example, modifications to a blade's BIOS personality can be stored in the configuration database 62 to allow personality versioning, either by demand from a user request or through stored policies within the configuration database 62. Policy-driven versioning can be, for example, a periodic update of blade BIOS personality.

Personality updates of the BIOS can either be planned or be triggered by integrity check failures during boot. For example, during boot of a blade, its BIOS sends a request to its BMC and on to the provisioning agent code area 50 to check if there are any pending personality updates in the respective blade personality database. If the BMC request returns affirmatively, BIOS in turn sends a command to BMC to schedule a BIOS personality update. Similarly, if a BIOS personality integrity check fails, BIOS sends a command to BMC to schedule a BIOS personality update to recover BIOS data.

As discussed above, two-way communication occurs between the blades 20, 22, 24 and the IBPA 14 of the management module 12. For example, a blade can generate a request addressed to IBPA 14 seeking personality data for update or delivery of data packets by management module 12 that are directed to the blade. Since each blade can independently talk to IBPA 14 of the management module 12, concurrent updates of more than one blade are possible.

Traditional servers rely on pre-defined user key inputs during a boot sequence to alter the personality of the system. The user imports are often obtained in response to user prompts during booting, or through a set-up menu that accepts user input to configure the personality. More specifically, a user is prompted to enter-information during boot up by using keys having specific meanings. By contrast, the IBPA 14 handles all BIOS personality management so that key inputs are eliminated and allocation of the shared resources 16, for example, are performed in a timely and orderly fashion. Further, the IBPA 14 maintains and manages blade BIOS personalities so floppy-based maintenance software tools are not needed to recover BIOS personality data that has been lost or corrupted.

Figure 3:
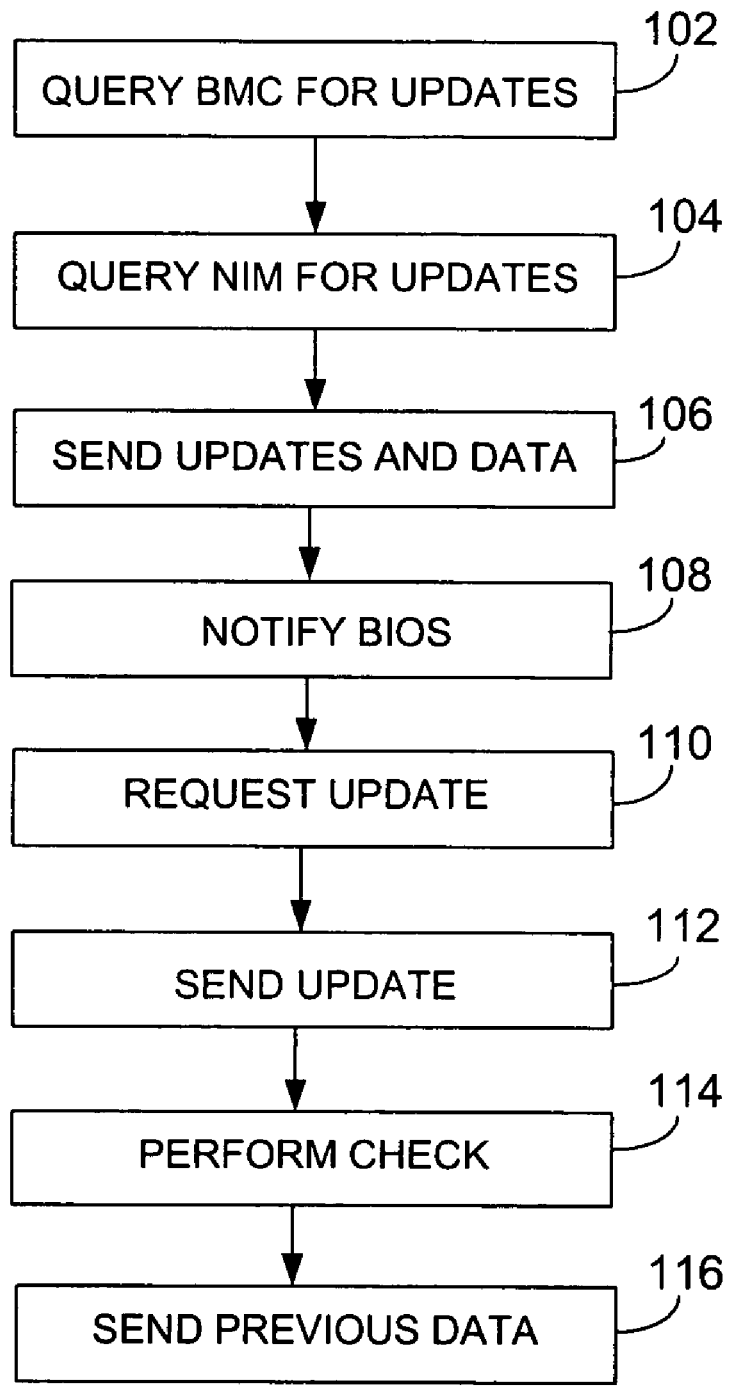
FIG. 3 is a flow diagram of personality data management.

In FIG. 3, a personality management data flow process 100 includes a BIOS of a blade querying (102) its BMC for planned BIOS personality data. The BMC queries (104) the management module for the planned BIOS personality data. The management module sends (106) BIOS personality data along with an update plan to both the IBPA and BMC. The BMC notifies (108) the BIOS of BIOS personality data availability. The BIOS requests (110) a BIOS personality update from its BIOS personality database. Each BIOS personality database includes entries unique to each blade, such as default boot order, localization, enabled and disabled features, resource allocation, authentication and authorization information, and version information. The IBPA sends (112) the updated BIOS personality data to the BIOS. The BIOS updates and performs (114) a BIOS personality integrity check during boot. If the BIOS determines that the requested BIOS personality of a current BIOS version is corrupted the IBPA sends (116) BIOS personality data associated with a previous version of the BIOS.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment.

Method steps of embodiments of the invention can be performed by one or more programmable processors executing a computer program to perform functions of embodiments of the invention by operating on input data and generating output. Method steps can also be performed by, and apparatus of embodiments of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Other embodiments are within the scope of the following claims.

What is claimed is:

1. A modular server comprising:
   blades, each of the blades including a corresponding storage module storing Basic Input Output System (BIOS) personality data;
   a computer system including dedicated resources and a BIOS personality configuration agent, the BIOS personality configuration agent having a data storage module storing, for each of the blades, a plurality of data records, each of the plurality of data records for a particular blade corresponding to a different version of the BIOS personality data for the particular blade, wherein the BIOS personality configuration agent is configured to send to at least one of the blades one of the plurality of data records corresponding to the at least one of the blades based on at least one of: a determination that updated BIOS personality data for the at least one of the blades is available, and a determination that a BIOS personality integrity check for the at least one of the blades failed; and
   a backplane connecting the computer system to the blades.

2. The server of claim 1 in which the BIOS personality configuration agent is a provisioning agent.

3. The server of claim 2 in which the provisioning agent comprises a code area and a data area.

4. The server of claim 3 in which the data area comprises the BIOS personality data associated with each of the blades.

5. The server of claim 4 in which the BIOS personality data includes boot order information.

6. The server of claim 4 in which the BIOS personality data includes enabled and disabled features.

7. The server of claim 4 in which the BIOS personality data includes allocation of resource information.

8. The server of claim 4 in which the BIOS personality data includes authentication and authorization information.

9. The server of claim 4 in which the data area further comprises configuration information.

10. The server of claim 9 in which the configuration information comprises blade personality updates.

11. The server of claim 9 in which the configuration information comprises version information.

12. The server of claim 4 in which the data area further comprises stock keeping unit (SKU) information.

13. The server of claim 12 in which the SKU information comprises mappings of blade BIOS personalities to blades.

14. A method comprising:
    in a modular server having blades, sending a request for a blade basic input output system (BIOS) personality update for a blade to a blade BIOS configuration agent based on at least one of: a determination that updated BIOS personality data is available for the blade at the BIOS configuration agent, and a determination that a BIOS personality integrity check for the blade failed; and
    scheduling the BIOS personality update in the blade;
    wherein the BIOS configuration agent having a data storage module storing, for each of the blades, a plurality of data records, each of the plurality of data records for a particular blade corresponding to a different version of the BIOS personality data for the particular blade.

15. The method of claim 14 further comprising executing the BIOS personality update in the blade.

16. The method of claim 14 in which the blade BIOS configuration agent is a blade BIOS personality provisioning agent.

17. The method of claim 16 in which the provisioning agent comprises a code area and a data area.

18. The method of claim 17 in which the data area comprises BIOS personality data associated with the blades.

19. The method of claim 18 in which the BIOS personality data includes boot order information.

20. The method of claim 18 in which the BIOS personality data includes enabled and disabled features.

21. The method of claim 18 in which the BIOS personality data includes resource allocation information.

22. The method of claim 18 in which the BIOS personality data includes authorization information.

23. The method of claim 17 in which the data area comprises blade BIOS configuration information.

24. The method of claim 23 in which the BIOS configuration information comprises BIOS personality update information.

25. The method of claim 23 in which the BIOS configuration information comprises version information.

26. The method of claim 17 in which the data area comprises stock keeping unit (SKU) information.

27. The method of claim 26 in which the SKU information maps a blade BIOS personality to the blade.

28. The method of claim 14 in which scheduling further comprises determining whether a planned BIOS personality update is scheduled.

29. A computer program product, stored in a machine readable storage device, for managing blade personalities in a modular server, the computer program product being operable to cause data processing apparatus to:

send a request for a blade Basic Input Output System (BIOS) personality update for at least one of a plurality of blades to a BIOS configuration agent based on at least one of: a determination that updated BIOS personality data is available for the at least one of the plurality of blades at the BIOS configuration agent, and a determination that a BIOS personality integrity check for the at least one of the plurality of blades failed; and schedule the BIOS personality update in the blade;

wherein the BIOS configuration agent having a data storage module storing, for each of the blades, a plurality of data records, each of the plurality of data records for a particular blade corresponding to a different version of the BIOS personality data for the particular blade.

30. The product of claim 29 further comprising the data processing apparatus to:

execute the BIOS personality update in the blade.

* * * * *